US011920557B2

(12) United States Patent
Spandley et al.

(10) Patent No.: US 11,920,557 B2
(45) Date of Patent: Mar. 5, 2024

(54) HEATING A WIND TURBINE BLADE

(71) Applicant: VESTAS WIND SYSTEMS A/S, Aarhus N (DK)

(72) Inventors: Luke Spandley, Ventnor (GB); Paul Badger, Salisbury (GB)

(73) Assignee: VESTAS WIND SYSTEMS A/S, Aarhus N (DK)

( * ) Notice: Subject to any disclaimer, the term of this patent is extended or adjusted under 35 U.S.C. 154(b) by 97 days.

(21) Appl. No.: 17/633,485

(22) PCT Filed: Aug. 4, 2020

(86) PCT No.: PCT/DK2020/050224
§ 371 (c)(1),
(2) Date: Feb. 7, 2022

(87) PCT Pub. No.: WO2021/023353
PCT Pub. Date: Feb. 11, 2021

(65) Prior Publication Data
US 2022/0282698 A1 Sep. 8, 2022

(30) Foreign Application Priority Data

Aug. 5, 2019 (DK) .......................... PA 2019 70495

(51) Int. Cl.
*F03D 1/06* (2006.01)
*F03D 80/40* (2016.01)

(52) U.S. Cl.
CPC .......... *F03D 1/0675* (2013.01); *F03D 80/40* (2016.05); *F05B 2240/30* (2013.01); *F05B 2270/301* (2013.01)

(58) Field of Classification Search
CPC .................................. F03D 80/40; F03D 80/60
See application file for complete search history.

(56) References Cited

U.S. PATENT DOCUMENTS

2005/0242233 A1 11/2005 Battisti
2008/0099617 A1 5/2008 Gilmore et al.
(Continued)

FOREIGN PATENT DOCUMENTS

EP 1873060 A1 1/2008
GB 2450503 A 12/2008
(Continued)

OTHER PUBLICATIONS

Danish Patent and Trademark Office, 1st Technical Examination including The Search Report and Search Opinion for Application PA 2019 70495 dated Jan. 28, 2020.
(Continued)

*Primary Examiner* — Long T Tran
(74) *Attorney, Agent, or Firm* — Patterson + Sheridan, LLP

(57) ABSTRACT

A first aspect of the invention provides a wind turbine blade having a blade shell that defines a suction side, pressure side, leading edge, and a trailing edge of the blade. The blade further comprises a blade heating system comprising one or more heating elements configured to heat the blade in first and second heating areas, wherein the first heating area is closer to the leading edge than the second heating area is, and the heating system is configured to generate heat fluxes in the first and second heating areas such that the heat flux generated in the first heating area is lower than the heat flux generated in the second heating area.

20 Claims, 3 Drawing Sheets

(56) References Cited

U.S. PATENT DOCUMENTS

| | | |
|---|---|---|
| 2008/0181775 A1 | 7/2008 | Livingston et al. |
| 2013/0028738 A1* | 1/2013 | Nordin .................... F03D 80/30 |
| | | 416/39 |
| 2013/0136598 A1* | 5/2013 | Loewe ............... B29D 99/0025 |
| | | 29/854 |
| 2014/0348654 A1* | 11/2014 | Klein ..................... F03D 80/40 |
| | | 416/95 |
| 2015/0003998 A1* | 1/2015 | Lauritsen ............. F03D 1/0675 |
| | | 416/95 |
| 2015/0023792 A1* | 1/2015 | Spitzner ................. F03D 80/40 |
| | | 416/1 |
| 2016/0047356 A1* | 2/2016 | Pawis .................... F03D 13/10 |
| | | 29/889.71 |
| 2017/0254316 A1* | 9/2017 | Philipsen ............... F03D 80/40 |
| 2019/0003463 A1* | 1/2019 | Buggy ................... F03D 80/40 |
| 2019/0063407 A1* | 2/2019 | Roeper .................. F03D 80/40 |

FOREIGN PATENT DOCUMENTS

| | | |
|---|---|---|
| GB | 2509729 A | 7/2014 |
| WO | 2017190748 A1 | 11/2017 |
| WO | 2021023353 A1 | 2/2021 |

OTHER PUBLICATIONS

PCT, International Search Report and Written Opinion of The International Searching Authority for Application PCT/DK2020/050224 dated Nov. 3, 2020.

* cited by examiner

HEATING A WIND TURBINE BLADE

FIELD OF THE INVENTION

The present invention relates to a wind turbine blade and method of heating a wind turbine blade.

BACKGROUND OF THE INVENTION

During conditions when the temperature is low or there is a lot of moisture in the air, ice can form on the blades of wind turbines. Such ice build-up reduces the aerodynamic performance of the wind turbine blade and thus reduces the efficiency and performance of the wind turbine.

Electro-thermal heating (ETH) elements may be used for either or both of anti-icing (preventing ice accumulating) or de-icing (removing accumulated ice) of the blade. An example is shown in WO2017/190748, in which two or more ETH panels are overlapping in order to provide a predetermined heat flux.

Conventionally such ETH elements are provided only at the leading edge of the blade. A problem with conventional ETH elements is that when water droplets flow past the trailing edge of the ETH element, they can freeze to form an ice ridge.

SUMMARY OF THE INVENTION

A first aspect of the invention provides a wind turbine blade having a blade shell that defines a suction side, pressure side, leading edge, and a trailing edge of the blade. The blade further comprises a blade heating system comprising one or more heating elements configured to heat the blade in first and second heating areas, wherein the first heating area is closer to the leading edge than the second heating area is, and the heating system is configured to generate heat fluxes in the first and second heating areas such that the heat flux generated in the first heating area is lower than the heat flux generated in the second heating area, so that the heat flux generated in the second heating area is sufficient to cause water to evaporate.

It has been realised that the heat flux required to evaporate water droplets reduces aft of the leading edge of the blade. So, positioning a second (higher heat flux) heating area further from the leading edge than a first (lower heat flux) heating area means that less heat flux is required to cause a significant degree of evaporation and inhibit the formation of an ice ridge.

The first heating area may be configured for either or both of anti-icing (preventing ice accumulating) or de-icing (removing accumulated ice) of the blade.

The heating system may be configured to simultaneously generate heat fluxes in the first and second heating areas such that the heat flux generated in the first heating area is lower than the heat flux generated in the second heating area.

The heating system may be configured to generate heat fluxes in the first and second heating areas over a heating period such that, on average over the heating period, the heat flux generated in the first heating area is lower than the heat flux generated in the second heating area.

The first heating area may extend over a greater chordwise distance than the second heating area. This provides an efficient arrangement for a given quantity of available power and can maximise the area heated (via the relatively large first heating area) whilst using the smaller second heating area to prevent or at least inhibit the formation of an ice ridge aft of the first heating area.

The first and second heating areas may be at overlapping spanwise positions. This ensures that water flowing across the blade flows from the first heating area into the second heating area.

The first and second heating areas may have the same (or substantially the same) spanwise sizes or they may have different spanwise sizes.

The second heating area may have a leading edge at a chordwise position of more than 5% chord, more than 10% chord, more than 15% chord or more than 20% chord. Locating the second heating area at such a relatively high chordwise position reduces power consumption because the power required to evaporate water tends to reduce as the chordwise position increases.

The one or more heating elements may comprise first and second heating elements configured to heat the blade in the first and second heating areas respectively.

The first heating element may comprise a panel of conductive resistive material, and the second heating element may comprise a thin strip or wire of conductive resistive material.

The second electro-thermal heating element may have a lower sheet resistance (in ohms square) than the first electro-thermal heating element.

The second electro-thermal heating element may have a lower sheet resistance (in ohms) than the first heating element.

The one or more heating elements may be electro-thermal heating elements.

The one or more heating elements may comprise a conductive resistive material, for example a veil of fibres (such as carbon fibres) or a metallic mesh.

The heating system may be configured to generate an average heat flux in the second heating area which is at least twice an average heat flux generated in the first heating area. In other words, the heating system may be configured to generate a first average heat flux across the first heating area and a second average heat flux across the second heating area, and the second average heat flux may be at least twice the first heat flux.

The second heating area may be closer to the trailing edge than the first heating area is.

The whole of the second heating area may be closer to the trailing edge than a trailing edge of the first heating area is.

The first and second heating areas may be contiguous. That is, there may be no gaps between the first and second heating areas.

A further aspect of the invention provides a wind turbine comprising a wind turbine blade according to the first aspect of the invention.

A further aspect of the invention provides a method of heating a wind turbine blade, the wind turbine blade having a blade shell that defines a suction side, pressure side, leading edge, and a trailing edge of the blade, the method comprising: heating the blade in first and second heating areas, wherein the first heating area is closer to the leading edge than the second heating area is, and the first heating area is heated with a lower heat flux than the second heating area.

The second heating area may be heated to a higher temperature than the first heating area.

The method may comprise simultaneously heating the blade in the first and second heating areas, so that the first heating area is heated with a lower heat flux than the second heating area.

The method may comprise heating, over a heating period, the blade in the first and second heating areas such that, on average over the heating period, the first heating area is heated with a lower heat flux than the second heating area.

Typically, the second heating area is heated with a heat flux sufficient to cause water flowing across the second heating area to evaporate. Water may flow across the first heating area into the second heating area where it evaporates. There may be substantially no evaporation of the water flowing across the first heating area.

BRIEF DESCRIPTION OF THE DRAWINGS

Embodiments of the invention will now be described with reference to the accompanying drawings, in which.

DETAILED DESCRIPTION OF EMBODIMENT(S)

Figure 1:
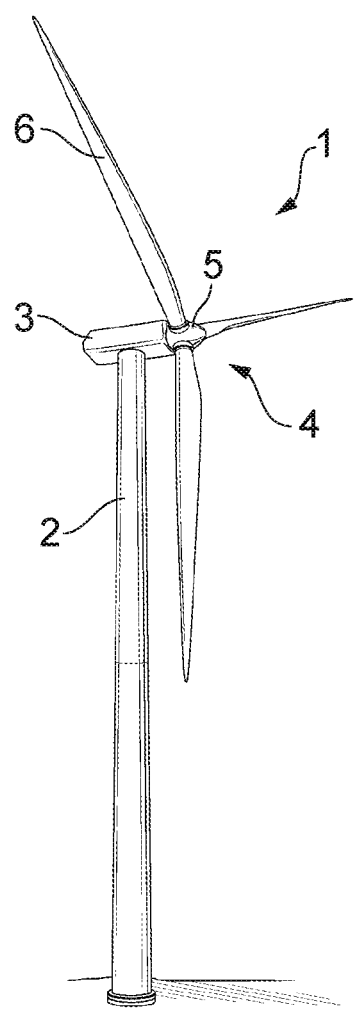
FIG. 1 shows a wind turbine.

FIG. 1 illustrates, in a schematic perspective view, a wind turbine 1. The wind turbine 1 includes a tower 2, a nacelle 3 at the apex of the tower, and a rotor 4 operatively coupled to a generator housed inside the nacelle 3. In addition to the generator, the nacelle houses miscellaneous components required for converting wind energy into electrical energy and various components needed to operate, control, and optimize the performance of the wind turbine 1. The rotor 4 of the wind turbine includes a central hub 5 and a plurality of blades 6 that project outwardly from the central hub 5. In the illustrated embodiment, the rotor 4 includes three blades 6, but the number may vary, for example the rotor 4 may have two or four blades. Moreover, the wind turbine 1 comprises a control system. The control system may be placed inside the nacelle 3 or distributed at a number of locations inside the turbine 1 and communicatively connected.

The wind turbine 1 may be included among a collection of other wind turbines belonging to a wind power plant, also referred to as a wind farm or wind park, that serve as a power generating plant connected by transmission lines with a power grid. The power grid generally consists of a network of power stations, transmission circuits, and substations coupled by a network of transmission lines that transmit the power to loads in the form of end users and other customers of electrical utilities.

Figure 2:
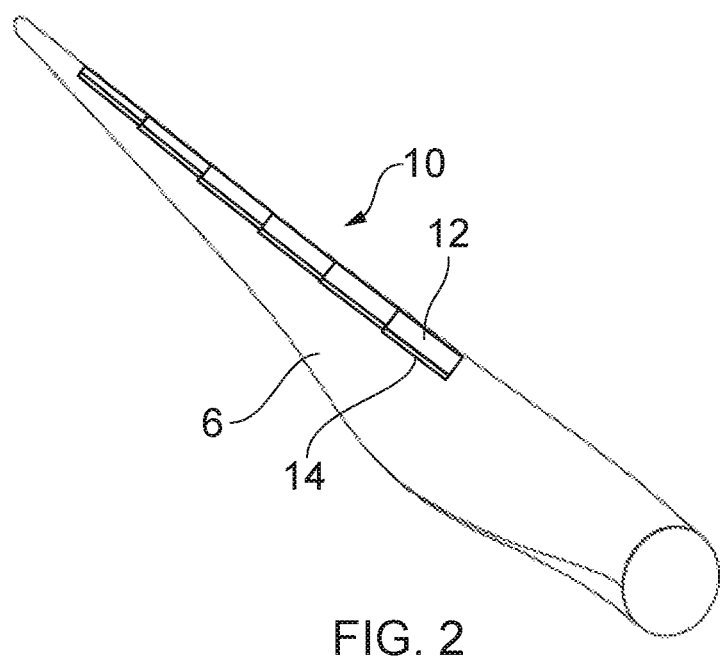
FIG. 2 shows a wind turbine blade with a plurality of heating elements.

Each blade 6 has a blade heating system 10 comprising twelve heating units, six of which are visible in FIG. 2. Each heating unit comprises two heating elements.

Figure 5:
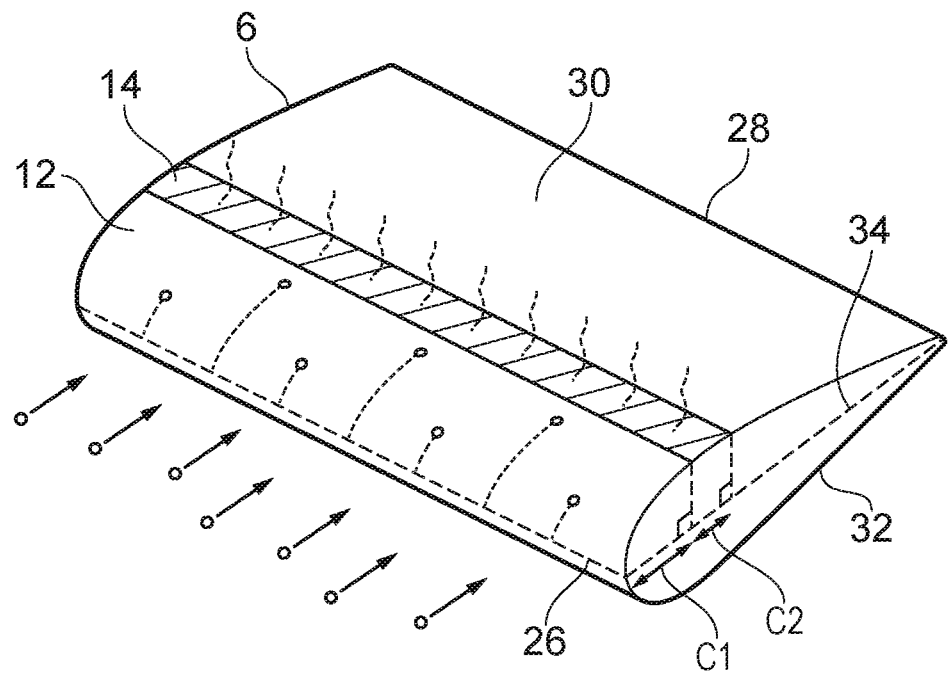
FIG. 5 shows part of a blade with a blade heating system according to an embodiment of the invention.

As shown most clearly in FIG. 5, each blade 6 has a blade shell that defines a suction side 30, pressure side 32, leading edge 26, and a trailing edge 28 of the blade. Six of the heating units are provided on the suction side 30 and are visible in FIG. 2. The other six heating units are on the pressure side 32 and hidden in FIG. 2.

The chordwise sizes of the heating units may decrease with proximity to the blade tip, as shown in FIG. 2. For example, the heating unit closest to the blade tip may have the smallest chordwise size and the heating unit farthest from the blade tip (and closest to the blade root) may have the largest chordwise size.

The heating elements are identical (apart from their chordwise size) so only an exemplary one of the heating units is numbered and will be described below.

The exemplary heating unit comprises first and second electro-thermal heating elements 12, 14 that are configured to heat the blade in first (anti-icing) and second (evaporative) heating areas respectively. The first heating element 12 (and its associated heating area) is located closer to the leading edge 26 of the blade than the second heating element 14 (and its associated heating area) is. The first and second heating elements 12, 14 are configured to generate heat fluxes in their respective first and second heating areas such that the heat flux generated in the first heating area is lower than the heat flux generated in the second heating area.

Each of the first and second heating elements 12, 14 may comprise a respective sheet 16, 18 of conductive resistive material, such as a veil of fibres, or specifically a veil of carbon fibres.

Figure 3:
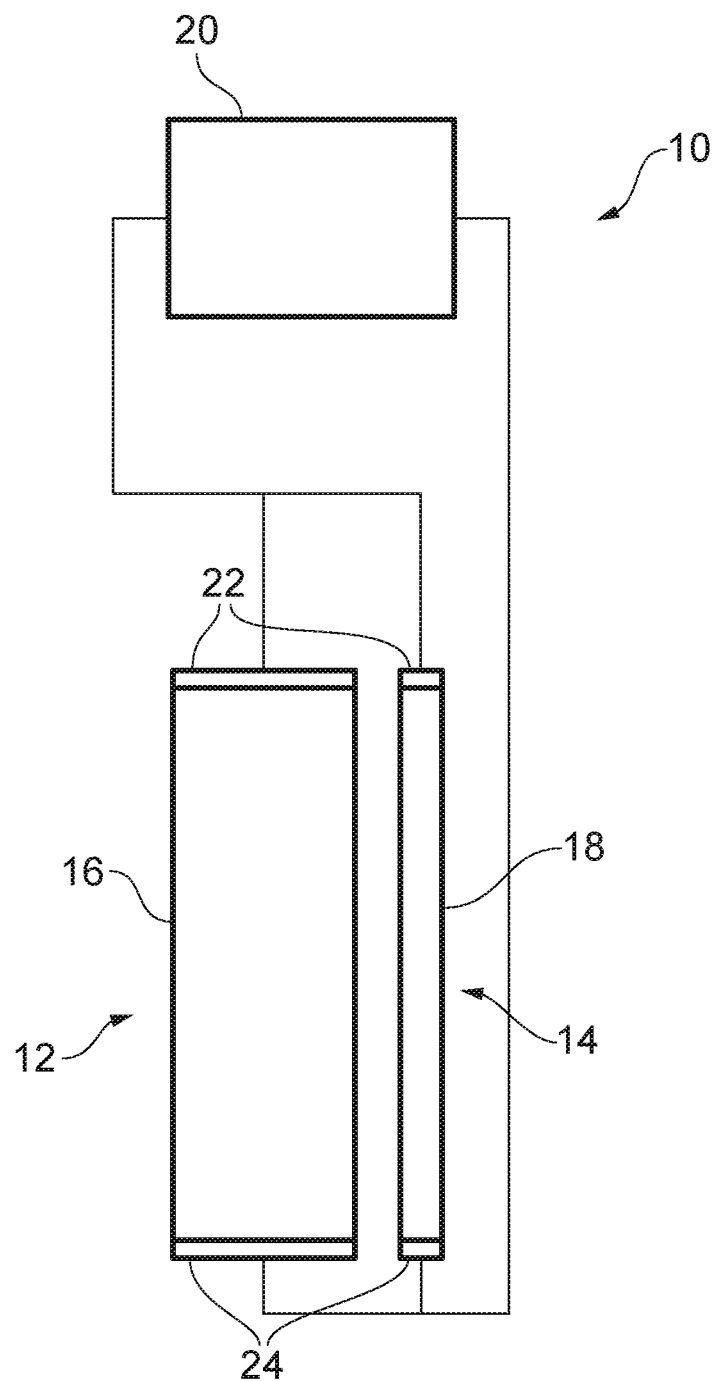
FIG. 3 shows how one of the heating units is driven.

FIG. 3 shows an example of how the two heating elements 12, 14 may be driven. Each heating element has an electrode 22 at one end and an electrode 24 at the other. A power source 20 drives the heating elements in parallel by applying an AC or DC voltage between the electrodes 22, 24. This causes currents to flow through the sheets 16, 18, and the resistance in the carbon veil material causes heat to be generated by resistive heating, Joule heating or Ohmic heating.

The heat flux output by each heating element is $V^2/(R_s*L^2)$, where V is the voltage between the electrodes 22, 24, $R_s$ is the sheet resistance of the carbon veil (in ohms square) and L is the length between the electrodes 22, 24. Therefore the sheet resistance $R_s$ of the carbon veil sheet 18 of the second heating element 14 may be chosen to be lower than the sheet resistance of the carbon veil sheet 16 of the first heating element 12 (for instance the veil material may be thicker or it may have a higher density of carbon fibres) so its heat flux is higher, typically by a factor of two or more.

Figure 4:
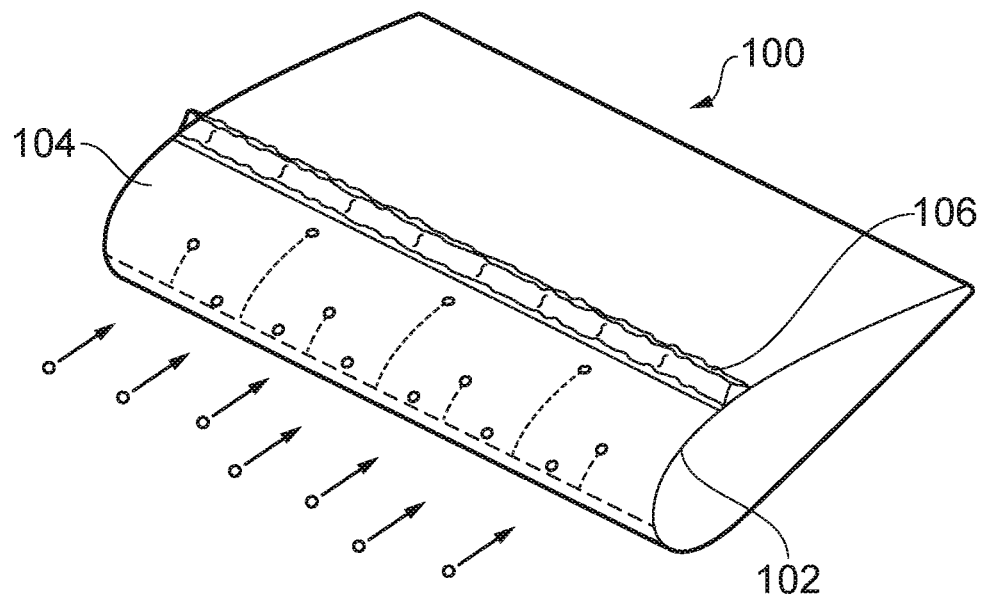
FIG. 4 is a comparative example showing part of a blade with a blade heating system.

Referring now to FIG. 4, a comparative blade heating system 100 is shown, to illustrate the problem of ice ridge build-up. The heating system 100 comprises a single anti-icing heating element 102 configured to heat a single heating area 104 at the leading edge. As water droplets impact the heating area 104, the heat from the heating element 102 ensures that most water droplets are maintained in the liquid phase rather than freezing. The water droplets run back past the trailing edge of the heating area 104, at which point they freeze to form an ice ridge 106. This ice ridge 106 has substantial effects on the aerodynamic performance of the blade, and its presence negatively impacts the wind turbine's efficiency and performance. Such ridges can be built up on both the suction side and the pressure side of the blade.

FIG. 5 illustrates the operation of the exemplary one of the heating units 12, 14. Water droplets impact the leading edge, and the heat flux generated by the first heating element 12 ensures that most stay in the liquid phase and do not freeze.

The first heating element 12 is located at or close to the leading edge 26 of the blade 6, where the majority of the water droplets impact the blade 6. In this example the leading edge of the first heating element 12 (and its associated first heating area) may be at the leading edge 26 of the blade (which is typically manufactured in two half-shells).

The water droplets run across the first heating area in the chordwise direction towards the trailing edge 28, and remain liquid due to the heating effect of the first heating element 12. The water droplets then flow from the first heating area into the second heating area above the second heating element 14, where they experience a higher temperature, and a higher heat flux, which causes them to evaporate.

There may be little or no gap between the heating elements 12, 14 so the first and second heating areas are contiguous as shown in FIG. 5, or there may be a small gap between the heating elements 12, 14 as shown schematically in FIG. 3.

The heat flux required to evaporate the water droplets is at a maximum at the leading edge 26 and reduces in the chordwise direction. So positioning the second (evaporative) heating element 14 aft of the first (anti-icing) heating element 12 (rather than vice versa) means that less heat flux is required to cause a significant degree of evaporation and inhibit the formation of an ice ridge.

The leading edge of the second heating element 14 (and its associated second heating area) may have a chordwise position in the range of 20%-30% chord, for example. The heat flux required to evaporate water at this chordwise position is less than would be required at the leading edge.

The chordwise size of the first heating element 12 may be greater than the chordwise size of the second heating element 14, In other words, the dimension C1 of the first heating element 12 projected onto the blade chord 34 shown in FIG. 5 may be greater than the dimension C2 of the second heating element 14 projected onto the blade chord 34.

The second heating element 14 only requires a relatively small chordwise size because the water droplets will evaporate relatively quickly, as long as the heat flux is sufficient. Thus, the sheet 18 of the second heating element 13 may be a narrow strip or wire, compared with the sheet 16 of the first heating element 12 which may be a relatively wide panel.

The first and second heating elements 12, 14 may have the same spanwise sizes, as shown in FIG. 2. The first and second heating elements 12, 14 may also have the same or overlapping spanwise positions, meaning that a water droplet, travelling chordwise across the surface of the blade, starting from the leading edge 26, may flow across the first heating element 12 followed by the second heating element 14. The first heating element 12 may have a larger area than the second heating element 14 as shown in FIG. 3.

In the example described above, the heating elements 12, 14 are powered simultaneously by the power source 20. In another example, rather than driving the elements 12, 14 simultaneously, power could be supplied to the first heating element 12 for a few seconds and then the second heating element 14 for a few seconds, the cycle being repeated over a heating period (which may be hours or days for example). Thus, the elements 12, 14 are hot simultaneously but not necessarily powered simultaneously.

In both of these examples, on average for the heating period, the heat flux (in Watts per square metre) generated in the first heating area by the first heating element 12 is lower than the heat flux generated in the second heating area by the second heating element 14. The temperature of the second heating area may also be greater, on average, than the temperature of the first heating area.

In the examples described above, the heat fluxes generated by the first and second heating elements 12, 14 may be substantially constant across the first and second heating areas respectively. If the heat fluxes vary across the first and second heating areas, then the average (and/or maximum) heat flux generated across the first heating area by the first heating element 12 may be lower than the average (and/or maximum) heat flux generated across the second heating area by the second heating element 14.

The average heat flux generated by the second heating element 14 in the second heating area is preferably at least twice the average heat flux generated by the first heating element 12 in the first heating area.

As mentioned above, the first and second heating elements 12, 14 are configured to heat respective first and second heating areas such that the heat flux is different. This difference of heat flux between the heating elements may be achieved as described above by using carbon veil materials with different sheet resistances, but other ways are possible.

In one alternative, the second heating area may be heated by a pair of overlapping heating elements as described WO2017/190748, whereas the first heating area is heated by only a single heating element.

In another alternative, the heating elements may be identical but the second heating element driven by a higher voltage.

In a further alternative the heating element 14 may be a heating wire or a network or an arrangement of heating wires.

The first and second heating areas may be heated by respective independent heating elements 12, 14 as described above. In other examples, a single heating element may heat both heating areas. For instance, a single heating element may have carbon veil regions with different sheet resistances which generate different heat fluxes.

In the example each side of the blade has six heating units, each with a pair of heating elements 12, 14. Other arrangements are possible. For instance, there may be only a single evaporative heating element which replaces the six evaporative heating elements 14 and runs along the blade for the same spanwise length.

The pressure side 32 of the blade may have heating elements identical to those on the suction side 30 shown in FIG. 2 (i.e. with both anti-icing heating elements 12 and evaporative heating elements 14).

Alternatively, the pressure side of the blade may only have anti-icing heating elements 12 (i.e. it has no evaporative heating elements 14). The reverse may also be true—i.e. the pressure side 32 of the blade may have both anti-icing heating elements 12 and evaporative heating elements 14, whilst the suction side of the blade only has anti-icing heating elements 12 (i.e. it has no evaporative heating elements 14).

Although the invention has been described above with reference to one or more preferred embodiments, it will be appreciated that various changes or modifications may be made without departing from the scope of the invention as defined in the appended claims.

The invention claimed is:

1. A wind turbine blade having a blade shell that defines a suction side, pressure side, leading edge, and a trailing edge of the blade, the blade further comprising a blade heating system comprising one or more heating elements configured to heat the blade in first and second heating areas, wherein the first heating area is closer to the leading edge than the second heating area is, and the heating system is configured to generate heat fluxes in the first and second heating areas such that the heat flux generated in the first heating area is lower than the heat flux generated in the second heating area, wherein the heat flux generated in the second heating area is sufficient to cause water to evaporate.

2. A wind turbine blade according to claim 1, wherein the heating system is configured to generate heat fluxes in the first and second heating areas over a heating period such that, on average over the heating period, the heat flux generated in the first heating area is lower than the heat flux generated in the second heating area.

3. A wind turbine blade according to claim 1, wherein the first heating area extends over a greater chordwise distance than the second heating area.

4. A wind turbine blade according to claim 1, wherein the first and second heating areas are at overlapping spanwise positions.

5. A wind turbine blade according to claim 1, wherein the second heating area has a leading edge at a chordwise position of more than 10% chord.

6. A wind turbine blade according to claim 1, wherein the one or more heating elements comprise first and second heating elements configured to heat the blade in the first and second heating areas respectively.

7. A wind turbine blade according to claim 1, wherein the one or more heating elements are electro-thermal heating elements.

8. A wind turbine blade according to claim 1, wherein the heating system is configured to generate an average heat flux in the second heating area which is at least twice an average heat flux generated in the first heating area.

9. A wind turbine blade according to claim 1, wherein the second heating area is closer to the trailing edge than the first heating area is.

10. A method of heating a wind turbine blade, the wind turbine blade having a blade shell that defines a suction side, pressure side, leading edge, and a trailing edge of the blade, the method comprising: heating the blade in first and second heating areas, wherein the first heating area is closer to the leading edge than the second heating area is, and the first heating area is heated with a lower heat flux than the second heating area, so that the heat flux generated in the second heating area is sufficient to cause water to evaporate.

11. The method of claim 10 comprising heating, over a heating period, the blade in the first and second heating areas such that, on average over the heating period, the first heating area is heated with a lower heat flux than the second heating area.

12. The method of claim 10, wherein water flows across the first heating area into the second heating area where it evaporates.

13. A wind turbine, comprising:
a tower;
a nacelle disposed on the tower;
a generator disposed in the nacelle;
a rotor coupled to the generator and having a distal end extending from the nacelle;
a plurality of blades disposed on the distal end of the rotor; wherein at least blade of the plurality of blades comprises:
a blade shell that defines a suction side, pressure side, leading edge, and a trailing edge of the blade;
a blade heating system comprising one or more heating elements configured to heat the blade in first and second heating areas, wherein the first heating area is closer to the leading edge than the second heating area is, and the heating system is configured to generate heat fluxes in the first and second heating areas such that the heat flux generated in the first heating area is lower than the heat flux generated in the second heating area, wherein the heat flux generated in the second heating area is sufficient to cause water to evaporate on an exterior surface of the blade.

14. A wind turbine according to claim 13, wherein the heating system is configured to generate heat fluxes in the first and second heating areas over a heating period such that, on average over the heating period, the heat flux generated in the first heating area is lower than the heat flux generated in the second heating area.

15. A wind turbine according to claim 13, wherein the first heating area extends over a greater chordwise distance than the second heating area.

16. A wind turbine according to claim 13, wherein the first and second heating areas are at overlapping spanwise positions.

17. A wind turbine according to claim 13, wherein the second heating area has a leading edge at a chordwise position of more than 10% chord.

18. A wind turbine according to claim 13, wherein the one or more heating elements comprise first and second heating elements configured to heat the blade in the first and second heating areas respectively.

19. A wind turbine according to claim 13, wherein the one or more heating elements are electro-thermal heating elements.

20. A wind turbine according to claim 13, wherein the heating system is configured to generate an average heat flux in the second heating area which is at least twice an average heat flux generated in the first heating area.

* * * * *